(12) United States Patent
Garcia

(10) Patent No.: US 11,737,529 B2
(45) Date of Patent: Aug. 29, 2023

(54) FLYING UMBRELLA ASSEMBLY

(71) Applicant: Yasiel Garcia, Tampa, FL (US)

(72) Inventor: Yasiel Garcia, Tampa, FL (US)

( * ) Notice: Subject to any disclaimer, the term of this patent is extended or adjusted under 35 U.S.C. 154(b) by 443 days.

(21) Appl. No.: 17/029,755

(22) Filed: Sep. 23, 2020

(65) Prior Publication Data

US 2022/0087377 A1    Mar. 24, 2022

(51) Int. Cl.
*A45B 23/00* (2006.01)
*B64C 39/02* (2023.01)
*B64U 101/60* (2023.01)

(52) U.S. Cl.
CPC ............ *A45B 23/00* (2013.01); *B64C 39/024* (2013.01); *B64U 2101/60* (2023.01); *B64U 2201/10* (2023.01)

(58) Field of Classification Search
CPC ...................................................... A45B 23/00
See application file for complete search history.

(56) References Cited

U.S. PATENT DOCUMENTS

| 8,777,157 | B2 * | 7/2014 | Barrett | B64C 39/022 244/115 |
| 8,857,758 | B2 * | 10/2014 | Al-Garni | A45B 23/00 244/30 |
| 9,603,422 | B1 | 3/2017 | Lazo-Antumez | |
| 10,252,799 | B2 | 4/2019 | Mottale | |
| 10,293,936 | B1 | 5/2019 | Conn | |
| 10,306,959 | B2 | 6/2019 | Rosedale | |
| 10,597,155 | B2 | 3/2020 | Karabed | |
| 2009/0283630 | A1 * | 11/2009 | Al-Gami | A45B 23/00 244/33 |
| 2016/0031559 | A1 | 2/2016 | Zang | |
| 2018/0094448 | A1 | 4/2018 | Davis | |
| 2019/0011531 | A1 | 1/2019 | Xie | |
| 2019/0220648 | A1 * | 7/2019 | Janniello | G08G 5/0069 |
| 2020/0174477 | A1 * | 6/2020 | Li | A45B 11/00 |
| 2021/0188432 | A1 * | 6/2021 | Yagoub | A45B 25/20 |
| 2021/0300548 | A1 * | 9/2021 | Kinzer | A45B 23/00 |
| 2022/0340276 | A1 * | 10/2022 | Harris | G05D 16/107 |

FOREIGN PATENT DOCUMENTS

WO    WO-2018163082 A1 *  9/2018

* cited by examiner

*Primary Examiner* — Noah Chandler Hawk

(57) ABSTRACT

A flying umbrella assembly includes a flying drone that can fly through the air. An umbrella is removably attachable to the flying drone such that the umbrella can be flown above the ground. A tracking unit is carried by a user and the tracking unit broadcasts a tracking signal to the flying drone thereby facilitating the flying drone to fly within a predetermined distance of the tracking unit. In this way the flying drone positions the umbrella over the user regardless if the user is stationary or in motion. A personal electronic device is in wireless communication with the flying drone. The flying drone receives the sun tracking data from the personal electronic device to optimally position the umbrella for shading the user.

11 Claims, 7 Drawing Sheets

FLYING UMBRELLA ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to umbrella devices and more particularly pertains to a new umbrella device for flying an umbrella over a user while the user walks.

(2) Description of Related Art Including Information Disclosed Under 37 CFR 1.97 and 1.98

The prior art relates to umbrella devices including an umbrella that employs buoyant gas to float the umbrella. The prior art discloses a variety of flying drones for unmanned flight. The prior art discloses a flying drone that has a shield coupled thereto for shading a user. The prior art discloses flying drones that receive wireless guidance data from a remote source. The prior art discloses an aerial vehicle that follows a tracking signal broadcast from a wearable device.

BRIEF SUMMARY OF THE INVENTION

An embodiment of the disclosure meets the needs presented above by generally comprising a flying drone that can fly through the air. An umbrella is removably attachable to the flying drone such that the umbrella can be flown above the ground. A tracking unit is carried by a user and the tracking unit broadcasts a tracking signal to the flying drone thereby facilitating the flying drone to fly within a predetermined distance of the tracking unit. In this way the flying drone positions the umbrella over the user regardless if the user is stationary or in motion. A personal electronic device is in wireless communication with the flying drone. The flying drone receives the sun tracking data from the personal electronic device to optimally position the umbrella for shading the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
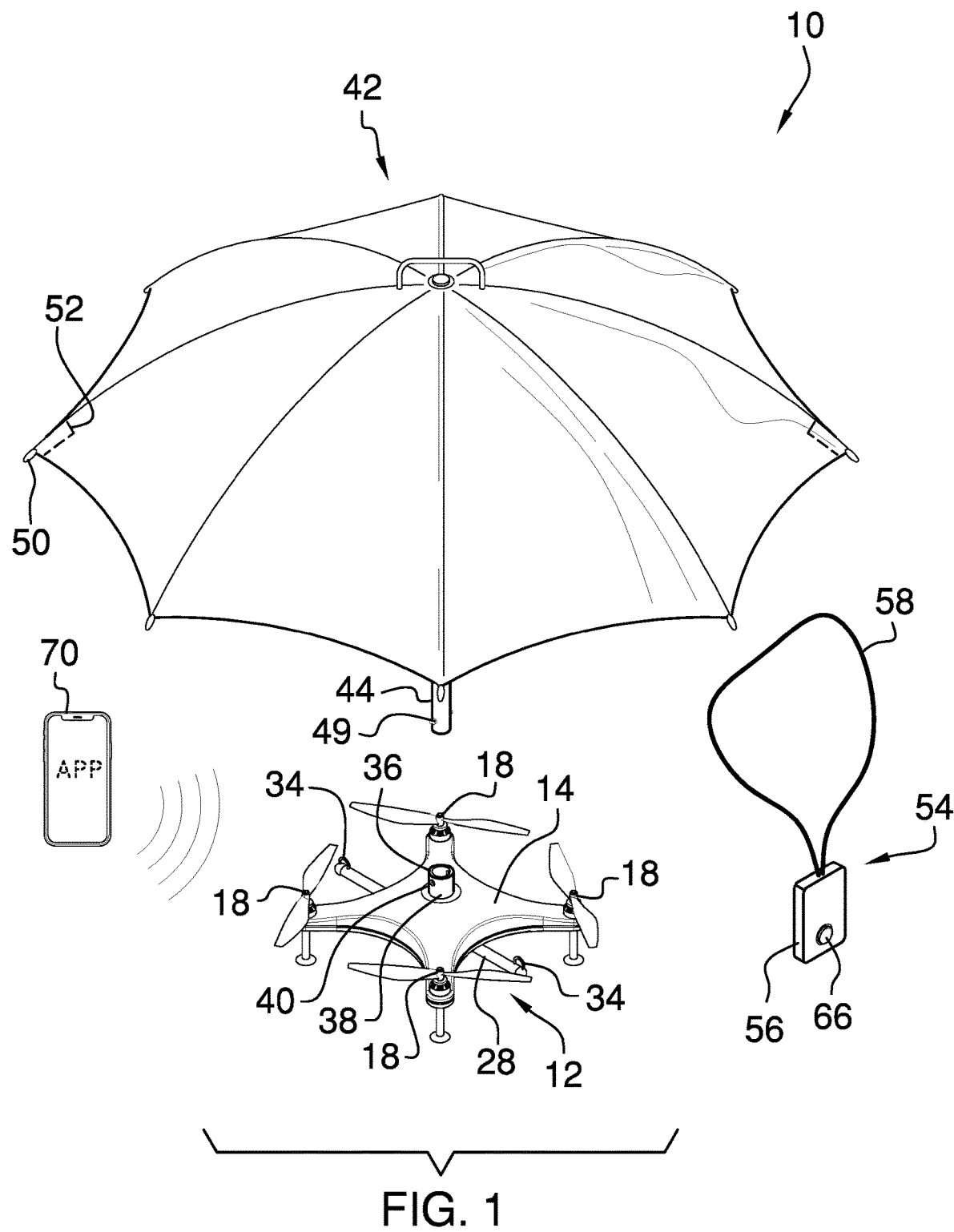
FIG. 1 is a perspective view of a flying umbrella assembly according to an embodiment of the disclosure.
Figure 2:
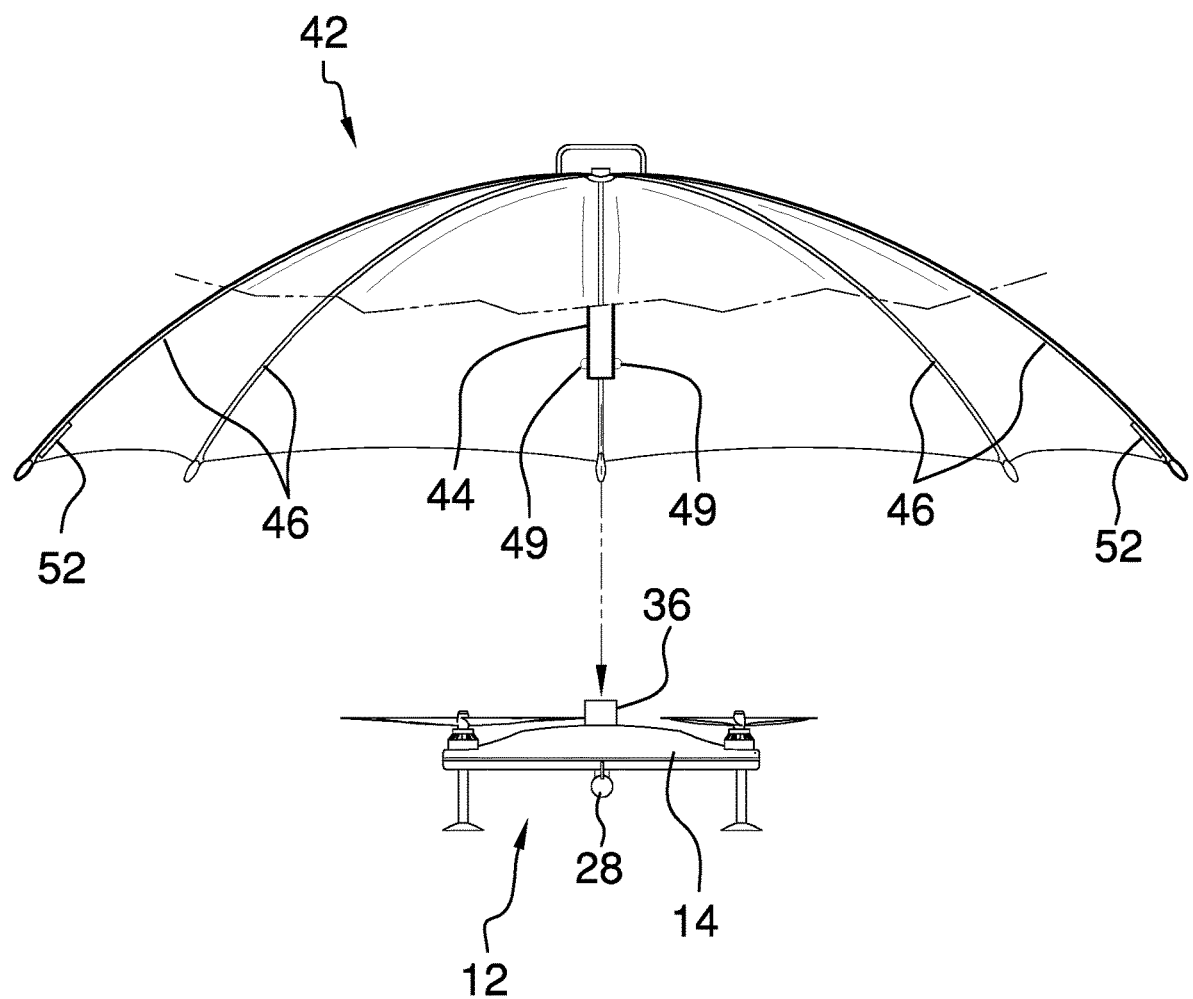
FIG. 2 is a right side exploded view of an embodiment of the disclosure.
Figure 3:
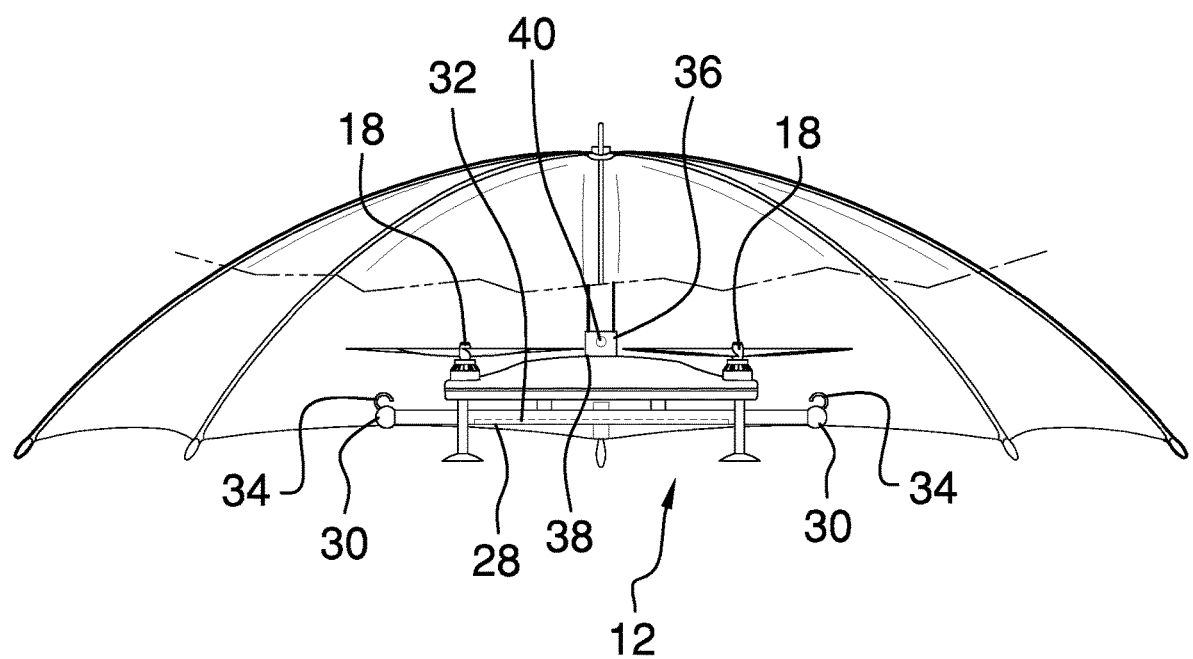
FIG. 3 is a back cut-away view of an embodiment of the disclosure.
Figure 4:
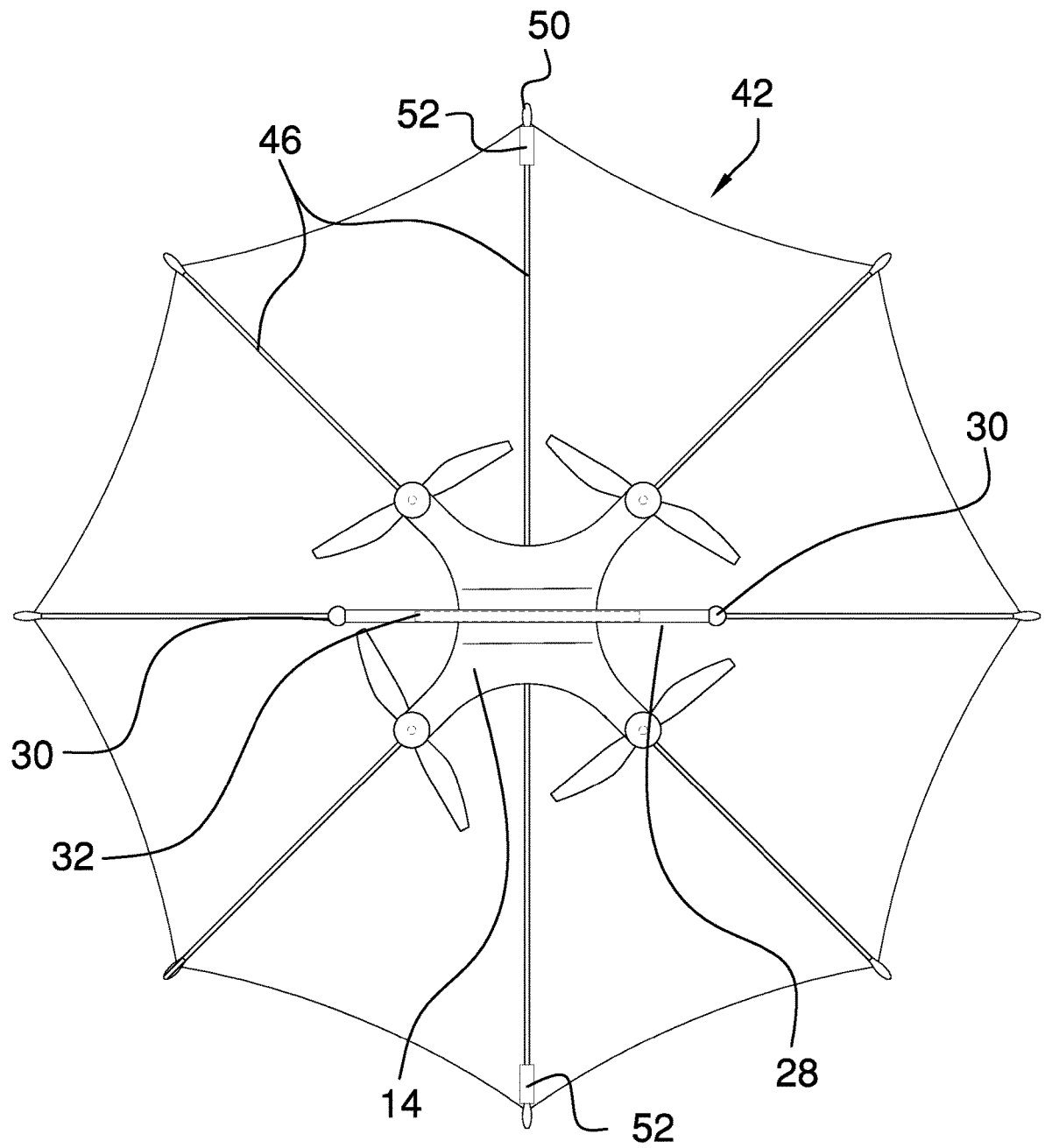
FIG. 4 is a bottom view of an embodiment of the disclosure.
Figure 5:
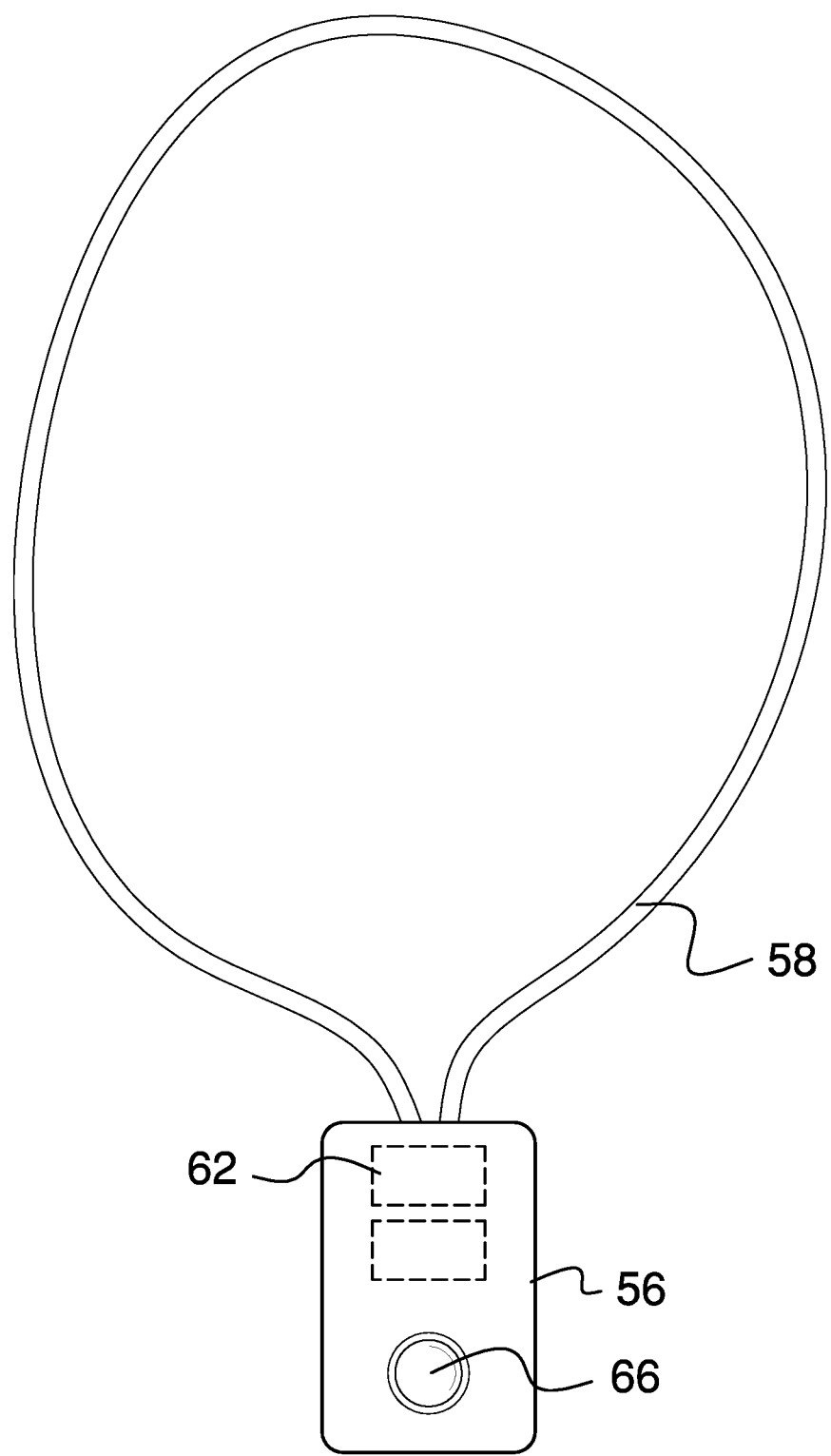
FIG. 5 is a phantom view of a tracking unit of an embodiment of the disclosure.
Figure 6:
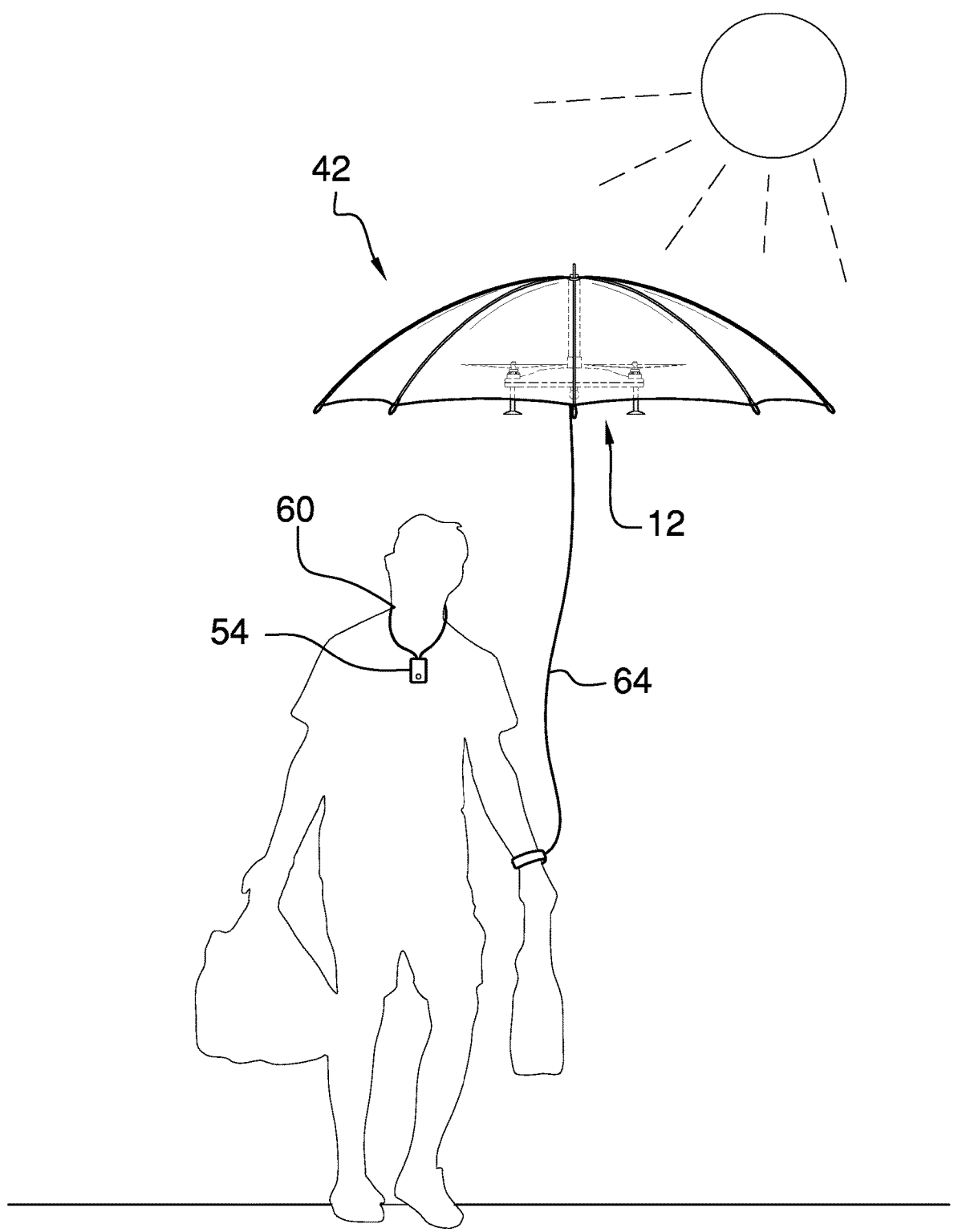
FIG. 6 is a perspective in-use view of an embodiment of the disclosure.
Figure 7:
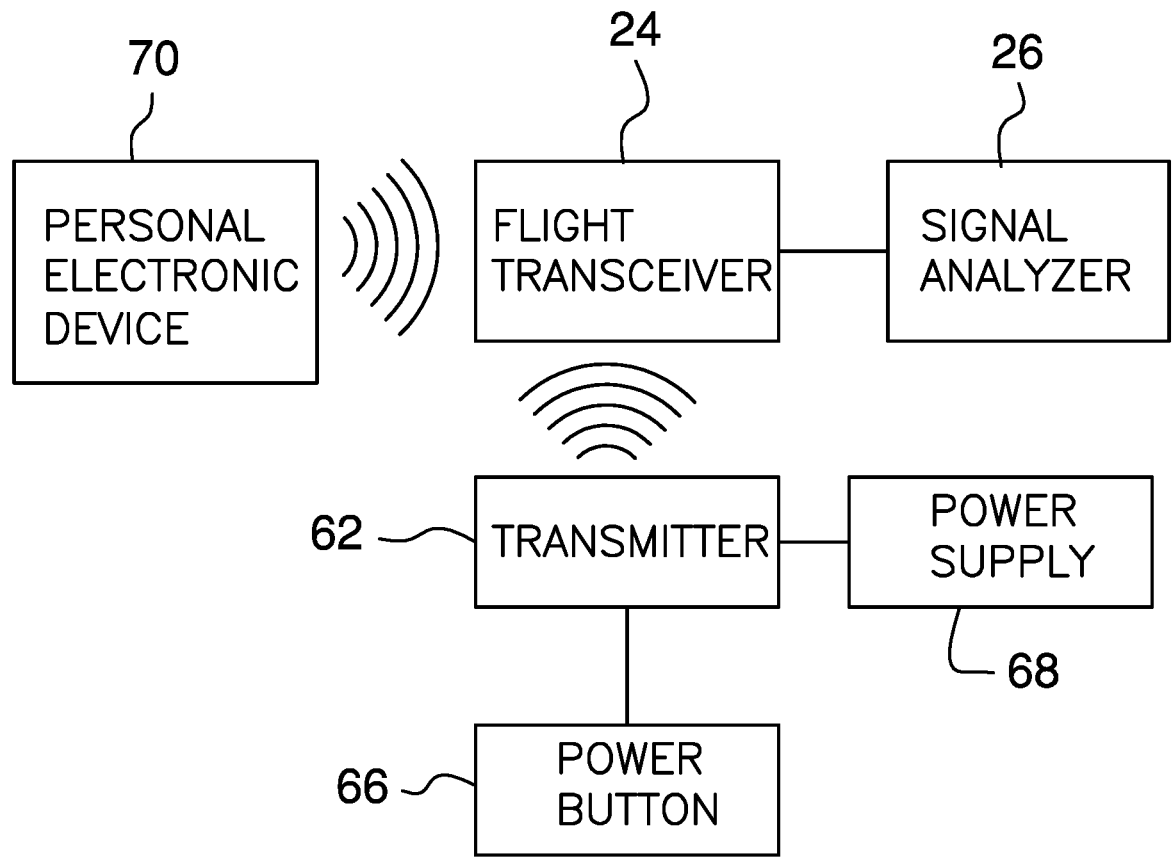
FIG. 7 is a schematic view of an embodiment of the disclosure.

With reference now to the drawings, and in particular to FIGS. 1 through 7 thereof, a new umbrella device embodying the principles and concepts of an embodiment of the disclosure and generally designated by the reference numeral 10 will be described.

As best illustrated in FIGS. 1 through 7, the flying umbrella assembly 10 generally comprises a flying drone 12 that can accomplish guided flight through the air. The flying drone 12 includes a body 14, flight control circuitry 16 and a plurality of propulsion units 18. The body 14 has a top side 20 and a bottom side 22, and the flight control circuitry 16 includes a flight transceiver 24 and a signal analyzer 26. The flight transceiver 24 may be a radio frequency receiver or the like and the flight transceiver 24 may employ Bluetooth communication protocols.

A member 28 is coupled to the bottom side 22 of the body 14 and the member 28 is oriented to extend laterally across the bottom side 22. The member 28 has a pair of ends 30 and each of the ends 30 of the member 28 is exposed with respect to the bottom side 22. A magnet 32 is integrated into the member 28 and the magnet 32 is centrally positioned between each of the ends 30 of the member 28. A pair of engagements 34 is each coupled to the member 28 and each of the engagements 34 is positioned adjacent to a respective one of the ends 30 of the member 28. A sleeve 36 is coupled to and extends 30 away from the flying drone 12 and the sleeve 36 extends 30 upwardly from the top side 20 of the body 14. The sleeve 36 is centrally positioned on the top side 20, the sleeve 36 has an outer wall 38 and the outer wall 38 has a plurality of holes 40 each extending therethrough.

An umbrella 42 is removably attachable to the flying drone 12 such that the umbrella 42 can to be flown above the ground. The umbrella 42 has a post 44, a plurality of ribs 46 and a canopy 48 and the post 44 has a plurality of engagements 49 each is movably coupled thereto. The sleeve 36 insertably receives the post 44 having each of the engagements 49 on the post 44 releasably engaging a respective one of the holes 40 in the outer wall 38 of the sleeve 36. In this way the umbrella 42 is removably retained on the flying drone 12. Each of the ribs 46 has an outer end 50 and each of the ribs 46 is bent around the flying drone 12 when the umbrella 42 is in a collapsed position has the outer end 50 of the ribs 46 being aligned with the magnet 32 in the member 28.

A plurality of plates 52 is provided and each of the plates 52 is coupled to respective one of the ribs 46. Additionally, each of the plates 52 is positioned adjacent to the outer end 50 of the respective rib. Each of the plates 52 is comprised of a ferromagnetic material and each of the plates 52 magnetically engages the magnet 32 when the umbrella 42 is in the collapsed position. In this way the umbrella 42 is releasably retained in the collapsed position.

A tracking unit 54 is provided that is carried by a user. The tracking unit 54 broadcasts a tracking signal to the flying drone 12 thereby facilitating the flying drone 12 to fly within a pre-determined distance of the tracking unit 54. In this way the flying drone 12 can position the umbrella 42 over the user regardless if the user is stationary or in motion. The tracking unit 54 comprises a housing 56 and a lanyard 58 that is coupled to the housing 56 for wearing around the user's neck 60.

The tracking unit 54 includes a transmitter 62 that is in wireless communication with the flight transceiver 24 of the flight controls in the flying drone 12. The transmitter 62 broadcasts the tracking signal to the flight transceiver 24. Additionally, the signal analyzer 26 in the flight controls analyzes the signal strength of the tracking signal thereby facilitating the flight controls to maintain the flying drone 12 within the pre-determined distance of the tracking unit 54. The transmitter 62 may comprise a radio frequency transmitter or the like.

A tether 64 is provided and the tether 64 can be coupled between a respective one of the engagements 34 on the member 28 and the user. In this way the flying drone 12 is inhibited from being blown away from the user by inclement weather. A power button 66 is movably coupled to the housing 56, the power button 66 is electrically coupled to the transmitter 62 and the power button 66 turns the transmitter 62 on and off. A power supply 68 is positioned in the housing 56, the power supply 68 is electrically coupled to the transmitter 62 and the power supply 68 comprises at least one battery.

A personal electronic device 70 is provided and the personal electronic device 70 is carried by the user. The personal electronic device 70 is in wireless communication with the flying drone 12. The personal electronic device 70 stores operational software that comprises sun tracking data and the flying drone 12 receives the sun tracking data from the personal electronic device 70. In this way the flying drone 12 can optimally position the umbrella 42 for shading the user from the sun. The personal electronic device 70 is in wireless communication with the flight transceiver 24 and the personal electronic device 70 may comprise a smart phone or other type of electronic device that has wireless communication capabilities. Additionally, the personal electronic device 70 may include a camera for monitoring the position of the sun in the sky.

In use, the umbrella 42 is attached to the flying drone 12 and the tracking unit 54 is worn around the user's neck 60. The flying drone 12 automatically launches to a pre-determined height to optimally position the umbrella 42 above the user. Additionally, the flying drone 12 follows the user when the user is walking. In this way the user is continually protected from precipitation. The personal electronic device 70 can by synched with the flying drone 12 to facilitate the flying drone 12 to position the umbrella 42 for shading the user from the sun.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A flying umbrella assembly for flying above a user to protect the user from rain and sun, said assembly comprising:

a flying drone being configured to fly through the air, wherein said flying drone includes a body, flight control circuitry and a plurality of propulsion units, said body having a top side and a bottom side, said flight control circuitry including a flight transceiver and a signal analyzer;

a sleeve being coupled to and extending away from said flying drone, wherein said sleeve extends upwardly from said top side of said body, said sleeve being centrally positioned on said top side, said sleeve having an outer wall, said outer wall having a plurality of holes each extending therethrough;

an umbrella being removably attachable to said sleeve wherein said umbrella is configured to be flown above the ground;

a tracking unit being configured to be carried by a user, said tracking unit broadcasting a tracking signal to said flying drone thereby facilitating said flying drone to fly within a pre-determined distance of said tracking unit wherein said flying drone is configured to position the umbrella over the user regardless if the user is stationary or in motion; and a personal electronic device being configured to be carried by the user, said personal electronic device being in wireless communication with said flying drone, said personal electronic device storing operational software comprising sun tracking data, said flying drone receiving the sun tracking data from said personal electronic device wherein said flying drone is configured to optimally position said umbrella for shading the user.

2. The assembly according to claim 1, further comprising a member being coupled to said bottom side of said body, said member being oriented to extend laterally across said bottom side, said member having a pair of ends, each of said ends of said member being exposed with respect to said bottom side.

3. The assembly according to claim 2, further comprising a magnet being integrated into said member, said magnet being centrally positioned between each of said ends of said member.

4. The assembly according to claim 2, further comprising a pair of engagements, each of said engagements being coupled to said member, each of said engagements being positioned adjacent to a respective one of said ends of said member.

5. The assembly according to claim 1, wherein said umbrella has a post, a plurality of ribs and a canopy, said post having a plurality of engagements each being movably coupled thereto, said sleeve insertably receiving said post having each of said engagements releasably engaging a respective one of said holes in said outer wall of said sleeve to removably retaining said umbrella on said flying drone.

6. The assembly according to claim 3, further comprising:
said umbrella having a post, a plurality of ribs and a canopy; and
wherein each of said ribs has an outer end, each of said ribs being bent around said flying drone when said umbrella is in a collapsed position having said outer end of said ribs being aligned with said magnet in said member.

7. The assembly according to claim 6, further comprising a plurality of plates, each of said plates being coupled to respective one of said ribs, each of said plates being positioned adjacent to said outer end of said respective rib, each of said plates being comprised of a ferromagnetic material, each of the plates magnetically engaging said magnet when said umbrella is in said collapsed position for releasably retaining said umbrella in said collapsed position.

8. A flying umbrella assembly for flying above a user to protect the user from rain and sun, said assembly comprising:
a flying drone being configured to fly through the air;
a sleeve being coupled to and extending away from said flying drone;
an umbrella being removably attachable to said sleeve wherein said umbrella is configured to be flown above the ground;
a tracking unit being configured to be carried by a user, said tracking unit broadcasting a tracking signal to said flying drone thereby facilitating said flying drone to fly within a pre-determined distance of said tracking unit wherein said flying drone is configured to position the umbrella over the user regardless if the user is stationary or in motion;
a personal electronic device being configured to be carried by the user, said personal electronic device being in wireless communication with said flying drone, said personal electronic device storing operational software comprising sun tracking data, said flying drone receiving the sun tracking data from said personal electronic device wherein said flying drone is configured to optimally position said umbrella for shading the user; and
wherein said tracking unit comprises:
a housing; and
a lanyard being coupled to said housing wherein said lanyard is configured to be worn around the user's neck.

9. The assembly according to claim 1 wherein said tracking unit includes a transmitter being in wireless communication with said flight transceiver of said flight controls in said flying drone, said transmitter broadcasting said tracking signal to said flight transceiver, said signal analyzer in said flight controls analyzing the signal strength of said tracking signal thereby facilitating said flight controls to maintain said flying drone within the pre-determined distance of said tracking unit.

10. The assembly according to claim 9, wherein said tracking unit includes:
a power button being movably coupled to said housing, said power button being electrically coupled to said transmitter, said power button turning said transmitter on and off; and
a power supply being positioned in said housing, said power supply being electrically coupled to said transmitter, said power supply comprising at least one battery.

11. A flying umbrella assembly for flying above a user to protect the user from rain and sun, said assembly comprising:
a flying drone being configured to fly through the air, said flying drone including a body, flight control circuitry and a plurality of propulsion units, said body having a top side and a bottom side, said flight control circuitry including a flight transceiver and a signal analyzer;
a member being coupled to said bottom side of said body, said member being oriented to extend laterally across said bottom side, said member having a pair of ends, each of said ends of said member being exposed with respect to said bottom side;
a magnet being integrated into said member, said magnet being centrally positioned between each of said ends of said member;
a pair of engagements, each of said engagements being coupled to said member, each of said engagements being positioned adjacent to a respective one of said ends of said member;
a sleeve being coupled to and extending away from said flying drone, said sleeve extending upwardly from said top side of said body, said sleeve being centrally positioned on said top side, said sleeve having an outer wall, said outer wall having a plurality of holes each extending therethrough;
an umbrella being removably attachable to said sleeve wherein said umbrella is configured to be flown above the ground, said umbrella having a post, a plurality of ribs and a canopy, said post having a plurality of engagements each being movably coupled thereto, said sleeve insertably receiving said post having each of said engagements releasably engaging a respective one of said holes in said outer wall of said sleeve to removably retaining said umbrella on said flying drone, each of said ribs having an outer end, each of said ribs being bent around said flying drone when said umbrella is in a collapsed position having said outer end of said ribs being aligned with said magnet in said member;
a plurality of plates, each of said plates being coupled to respective one of said ribs, each of said plates being positioned adjacent to said outer end of said respective rib, each of said plates being comprised of a ferromagnetic material, each of the plates magnetically engaging said magnet when said umbrella is in said collapsed position for releasably retaining said umbrella in said collapsed position;

a tracking unit being configured to be carried by a user, said tracking unit broadcasting a tracking signal to said flying drone thereby facilitating said flying drone to fly within a pre-determined distance of said tracking unit wherein said flying drone is configured to position the umbrella over the user regardless if the user is stationary or in motion, said tracking unit comprising:

a housing;

a lanyard being coupled to said housing wherein said lanyard is configured to be worn around the user's neck;

a transmitter being in wireless communication with said flight transceiver of said flight controls in said flying drone, said transmitter broadcasting said tracking signal to said flight transceiver, said signal analyzer in said flight controls analyzing the signal strength of said tracking signal thereby facilitating said flight controls to maintain said flying drone within the pre-determined distance of said tracking unit;

a power button being movably coupled to said housing, said power button being electrically coupled to said transmitter, said power button turning said transmitter on and off; and a power supply being positioned in said housing, said power supply being electrically coupled to said transmitter, said power supply comprising at least one battery; and a personal electronic device being configured to be carried by the user, said personal electronic device being in wireless communication with said flying drone, said personal electronic device storing operational software comprising sun tracking data, said flying drone receiving the sun tracking data from said personal electronic device wherein said flying drone is configured to optimally position said umbrella for shading the user, said personal electronic device being in wireless communication with said flight transceiver.

* * * * *